(12) United States Patent
Levine et al.

(10) Patent No.: US 11,087,738 B2
(45) Date of Patent: *Aug. 10, 2021

(54) SYSTEM AND METHOD FOR MUSIC AND EFFECTS SOUND MIX CREATION IN AUDIO SOUNDTRACK VERSIONING

(71) Applicant: Lucasfilm Entertainment Company Ltd. LLC, San Francisco, CA (US)

(72) Inventors: Scott Levine, San Anselmo, CA (US); Stephen Morris, Nicasio, CA (US)

(73) Assignee: Lucasfilm Entertainment Company Ltd. LLC, San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/438,335

(22) Filed: Jun. 11, 2019

(65) Prior Publication Data

US 2020/0394999 A1 Dec. 17, 2020

(51) Int. Cl.
*G10L 15/00* (2013.01)
*G10H 1/00* (2006.01)
(Continued)

(52) U.S. Cl.
CPC .......... *G10L 15/005* (2013.01); *G06F 16/683* (2019.01); *G06F 40/58* (2020.01);
(Continued)

(58) Field of Classification Search
CPC ..... G10L 15/005; G10L 15/20; G10L 15/063; G10L 2015/0631; G10L 2015/0638;
(Continued)

(56) References Cited

U.S. PATENT DOCUMENTS 8,655,152 B2 * 2/2014 Marks .................. G11B 27/036
386/278
8,655,655 B2 * 2/2014 Wang ...................... G10L 15/10
704/237

(Continued)

OTHER PUBLICATIONS

T. Ohanian, "How Artificial Intelligence and Machine Learning Will Change Content Creation Methodologies," SMPTE 2017 Annual Technical Conference and Exhibition, Hollywood & Highland, Los Angeles, California, 2017, pp. 1-15, doi: 10.5594/M001794. (Year: 2017).*

*Primary Examiner* — Edgar X Guerra-Erazo
(74) *Attorney, Agent, or Firm* — Sheppard Mullin Richter & Hampton LLP

(57) ABSTRACT

Implementations of the disclosure describe systems and methods that leverage machine learning to automate the process of creating music and effects mixes from original sound mixes including domestic dialogue. In some implementations, a method includes: receiving a sound mix including human dialogue; extracting metadata from the sound mix, where the extracted metadata categorizes the sound mix; extracting content feature data from the sound mix, the extracted content feature data including an identification of the human dialogue and instances or times the human dialogue occurs within the sound mix; automatically calculating, with a trained model, content feature data of a music and effects (M&E) sound mix using at least the extracted metadata and the extracted content feature data of the sound mix; and deriving the M&E sound mix using at least the calculated content feature data.

20 Claims, 7 Drawing Sheets

(51) Int. Cl.
  *G10L 15/06* (2013.01)
  *G06F 16/683* (2019.01)
  *G06F 40/58* (2020.01)
(52) U.S. Cl.
  CPC ......... *G10H 1/0025* (2013.01); *G10L 15/063* (2013.01); *G10L 2015/0631* (2013.01)
(58) Field of Classification Search
  CPC ..... G10L 15/26; G10L 13/033; G10L 13/086; G06F 40/20; G06F 40/263; G06F 40/58
  See application file for complete search history.

(56) References Cited

U.S. PATENT DOCUMENTS

| | | | | |
|---|---|---|---|---|
| 8,676,584 | B2* | 3/2014 | Schlosser | G10L 21/04 704/258 |
| 10,068,445 | B2* | 9/2018 | Nongpiur | G08B 13/1672 |
| 10,395,494 | B2* | 8/2019 | Nongpiur | G08B 13/1672 |
| 10,445,056 | B1* | 10/2019 | Morris | G10L 25/57 |
| 2006/0285654 | A1* | 12/2006 | Nesvadba | H04N 5/60 379/67.1 |
| 2010/0004937 | A1* | 1/2010 | Schlosser | G10L 21/04 704/503 |
| 2010/0127878 | A1* | 5/2010 | Wang | G10L 17/26 340/573.1 |
| 2011/0288862 | A1* | 11/2011 | Todic | G10H 1/368 704/235 |
| 2012/0290621 | A1* | 11/2012 | Heitz, III | G06F 16/639 707/780 |
| 2015/0003812 | A1* | 1/2015 | Soroka | H04N 9/8205 386/285 |
| 2016/0021476 | A1* | 1/2016 | Robinson | H04S 7/30 381/303 |
| 2016/0196252 | A1* | 7/2016 | Wu | G06F 16/43 715/231 |
| 2016/0379456 | A1* | 12/2016 | Nongpiur | G08B 13/1672 340/541 |
| 2018/0033454 | A1* | 2/2018 | Hardek | G10L 15/063 |
| 2018/0365950 | A1* | 12/2018 | Nongpiur | G08B 25/008 |

* cited by examiner

SYSTEM AND METHOD FOR MUSIC AND EFFECTS SOUND MIX CREATION IN AUDIO SOUNDTRACK VERSIONING

BRIEF SUMMARY OF THE DISCLOSURE

Implementations of the disclosure describe systems and methods that leverage machine learning to automate the process of creating music and effects (M&E) sound mixes using an original sound mix having domestic dialogue.

In one embodiment, a method includes: receiving a sound mix comprising human dialogue; extracting metadata from the sound mix, wherein the extracted metadata categorizes the sound mix; extracting content feature data from the sound mix, the extracted content feature data comprising an identification of the human dialogue and instances or times the human dialogue occurs within the sound mix; automatically calculating, with a trained model, content feature data of a music and effects (M&E) sound mix using at least the extracted metadata and the extracted content feature data of the sound mix; and deriving the M&E sound mix using at least the calculated content feature data. The content feature data extracted from the sound mix may further include one or more of: human dialogue-related data other than the identification of the human dialogue and times the human dialogue occurs within the sound mix, music-related data, and other sound data besides human dialogue-related data and music content-related data. The extracted metadata may identify one or more of the following categories of the sound mix: a domestic language, a production studio, a genre, a filmmaker, a type of media content, a re-recording mixer, a first frame of action (FFOA), and a last frame of action (LFOA).

In some implementations, the method further includes: using at least the extracted content feature data to generate a time-based content report file of content features contained within the sound mix, the content features including one or more of the following: a location of human dialogue contained within the sound mix, a location of non-dialogue human sounds contained within the sound mix, and a location of music contained within the sound mix. In particular implementations, the content features of the time-based content report file include an identification of licensable music contained within the sound mix.

In some implementations, the method further includes: mixing the derived M&E sound mix with a foreign language dialogue track to derive a foreign language sound mix comprising human dialogue of the foreign language dialogue track. In such implementations, the derived M&E sound mix may be mixed with the foreign language dialogue track to derive the foreign language sound mix using a second model trained using previously created foreign language sound mixes and associated M&E sound mixes and foreign language dialogue tracks. The second trained model may be used to adjust one or more of the following parameters of the derived foreign language sound mix: a dialogue to M&E balance, a dialogue spatial distribution, and a spectral shape.

In some implementations, automatically calculating content feature data of the M&E sound mix includes: using the trained model to map human dialogue-related data, music-related data, and other sound data of the sound mix including human dialogue to music-related data and other sound data of the M&E sound mix. Deriving the M&E sound mix may include: using at least the calculated content feature data of the M&E sound mix to perform one or more of the following operations: remove the identified human dialogue from the sound mix comprising human dialogue; and insert music or other non-dialogue sound data into locations of the sound mix where the identified human dialogue was removed. In particular implementations, the content feature data extracted from the sound mix further includes an identification of non-dialogue sounds present in a dialogue stem, and times the non-dialogue sounds occur within the dialogue stem.

In some implementations, the method further includes: creating the trained model, where creating the trained model includes: using a plurality of previously created sound mixes and associated M&E mixes to create a first dataset comprising extracted metadata and extracted content feature data for each of the plurality of previously created sound mixes and associated M&E mixes; dividing the first dataset into a training dataset and a testing dataset, where each of the training dataset and testing dataset include a plurality of sound mixes and associated M&E mixes; training the model using the training dataset, where the model is trained using at least a supervised learning algorithm that correlates a content feature of an original sound mix with a content feature of an M&E mix; and testing the model using the testing dataset.

In some implementations, automatically calculating, with a trained model, content feature data of the M&E sound mix, includes: selecting the trained model from a plurality of trained models based on at least a category of the sound mix identified from the extracted metadata.

In some implementations, the method further includes: distributing the derived M&E sound mix.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
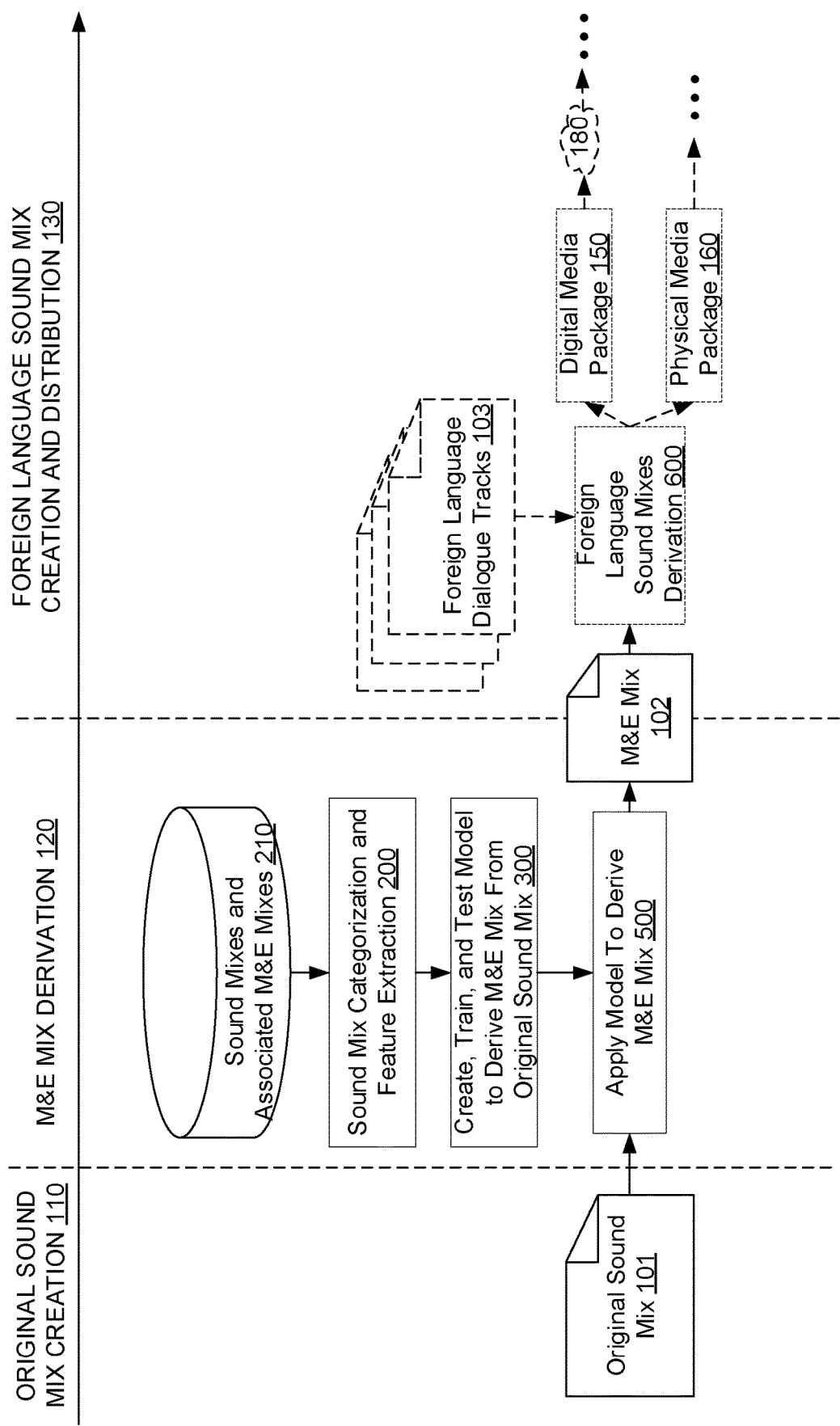
FIG. 1 illustrates a process flow for creating and using M&E mixes, in accordance with implementations of the disclosure.

The figures are not exhaustive and do not limit the disclosure to the precise form disclosed.

DETAILED DESCRIPTION

After initial production of media content such as a movie, television show, or television/episodic series, or other media production including an aural component with spoken dialogue, many different foreign language versions of an original sound mix having a foreign language dialogue track (i.e., a foreign language dub) may need to be created for the media content to account for distribution to various countries or regions. Traditionally, the music and entertainment industry relies on the creation of Music and Effects (M&E) sound mixes to create foreign language sound mixes. An M&E sound mix is a sound mix that excludes the domestic language dialogue of a domestic sound mix. An M&E sound mix may contain all sounds except the dialogue of the original sound mix, including music, sound effects, foley (e.g., footsteps, swishing clothing, squeaky doors, etc.), atmospheres, etc.

Traditionally, an M&E sound mix is created using manual processing to identify human dialogue and remove it from the soundtrack. In particular, the process may involve manual-decision making by a sound editor, as there may be specific requirements pertaining to what sounds are included or excluded from a soundtrack, based on content and regional context. For example, the sound editor may need to locate and extract any domestic-language content from the original final soundtrack while maintaining original sonic characteristics approved by filmmakers. Additionally, the sound editor may need to extract licensable content (e.g., music) that is excluded from the foreign soundtrack.

The resulting M&E mix may be used as the foundation to create foreign language/territory sound mixes. Traditionally, dialogue from one or more actor(s) in each of the associated territories is recorded (e.g., using a translated version of the original script) during the process of creating the foreign language sound mix. After a recording is available for a territory along with the M&E mix, the two mixes are manually mixed together, adjusted, and processed to derive a foreign language soundtrack that may be used with the content.

As such, the present process of creating an M&E sound mix to produce different foreign language sound mixes that comply with multiple distribution specifications is primarily a labor-intensive manual process that entails real-time, manual mix adjustments and processing. In light of the growing quantity of required foreign sound mixes (e.g., for film production), multiple problems are presented by current techniques for creating foreign sound mixes. One problem presented by current manual techniques is that the growing quantity of territorial-specific language versions increases production budget requirements, potentially reducing the time for creative collaboration with filmmakers. A second problem is that the time available for creating foreign language sound mixes has been reduced due to faster media content release timelines. In some instances, a foreign language version of a film may be released the same day or week as the domestic version. A third problem is that significant manual effort is involved for auxiliary sounds that must be identified and extracted as part of the process of creating an M&E mix. In particular, some auxiliary sounds include production sound effects such as non-dialogue sounds (e.g., chair noises, walking, car doors, background noise, breathing, grunting etc.) that are recorded on-set ("production") during dialogue lines. These sounds may be used in the soundtrack, but are baked into the dialogue audio, so they may need to be extracted and/or replaced when the domestic dialogue is removed. The identification, extraction, and/or replacement of these auxiliary sounds may often need to be handled on a case-by-case basis. A fourth problem is that in addition to the time and cost involved in manually creating M&E mixes and foreign mixes, there is the potential for human error in the manual production process.

Implementations of the disclosure are directed to addressing these and other problems that arise in present systems and methods for creating M&E mixes. To this end, the disclosure is directed to systems and methods that may leverage machine learning to automate the process of creating an M&E mix from an original sound mix including domestic dialogue. In accordance with implementations further described herein, a system for automated creation of M&E mixes may include (i) a component to extract metadata categorizing/identifying the input sound mix; (ii) a component to extract time-based content feature data of the input sound mix, the time-based content feature data including an identification of the presence of domestic language dialogue and where it is present within the sound mix; (iii) a component that uses a machine learning model to compare the extracted content features of the input sound mix with extracted content features of previously analyzed sound mixes having associated M&E mixes to calculate content features of a target M&E mix; and (iv) a component to perform signal processing to derive the target M&E mix given the calculated content features. Some implementations of the system described herein may include a component that uses the derived M&E sound mix and input sound mix to perform additional training of the model.

Additional implementations of the system described herein may include a component that uses the output of the component that extracts time-based content feature data to generate a human-readable time-based metadata output report of content features contained within the original sound mix.

Yet further implementations of the system described may include a component for automatically generating foreign language sound mixes using the derived M&E sound mix and input foreign language dialogue tracks.

By virtue of automating the process of M&E mix creation and leveraging machine learning to create a model of M&E mix creation that continuously improves, various advantages may be realized. First, the automation of the M&E mix versioning process may increase time available for creative collaboration between sound mixers and filmmakers. Second, the use of a continually learning model may be used to generate the best possible version of M&E mixes over time. Further, the systems and methods described herein may allow for movement of an M&E sound mix creation process into a head end of a distribution channel (e.g., a streaming service could derive any version of an M&E mix given an original mix.

Additionally, by virtue, in some implementations, of generating a human-readable time-based metadata output report of content features contained within the original sound mix (e.g., as a byproduct of creating the M&E mix)

additional advantages may be achieved. First, the metadata output report may be used to facilitate music licensing decision-making. For example, by providing a timeline reporting of vocal songs, territorial music licensing decisions may be facilitated. Second, the metadata output report may be used to facilitate making market-specific cuts to audio content. For example, by providing a dialogue tranrscription with a timeline, foreign censorship may be facilitated. Third, the metadata output report may be used for the foreign dialogue dubbing process. For example, by providing specific timeline-based information for each character's initiation of speech, this information may be used to synchronize the foreign dubbed audio clip for a given line of dialogue both for the capture of the foreign dialogue and the insertion into the M&E mix.

Furthermore, by virtue, in some implementations, of automatically generating foreign language sound mixes using the derived M&E sound mix and input foreign language dialogue tracks, additional advantages may be achieved. First, the costs and production time involved in creating foreign language sound mixes may be significantly reduced. Second, greater security of content may be realized as the pre-release media (including video) will not require distribution to a network of facilities performing the dubbing. Third, large quantities of versions may be created in parallel, providing for the ability to conduct a synchronized global release of the content.

These and other advantages that may be realized from implementing the systems and methods described may be further appreciated from the disclosure.

FIG. 1 illustrates a process flow for creating and using M&E mixes, in accordance with implementations of the disclosure. At process 110, an original sound mix 101 is created in a domestic language (e.g., English). The original sound mix 101 may be the first sound mix created for a film (e.g., sound mix for theater release), a television show, a television series, or other media production including an aural component with dialogue in a domestic language. The sounds of sound mix 101 may be directly captured (e.g., using a microphone), digitally created (e.g., using sound generation software), and/or edited prior to media production (e.g., prior to filming), during media production (e.g., during filming), and/or after media production (e.g., after filming/during post-production). The created sound mix 101 may be created as either a single combined mix, or as a multiple stem mix. Multiple stems (e.g., submixes), when combined, create the composite sound mix. For example, in the case of a film, a stem sound mix may comprise separate stems for dialogue, music, and sound effects. In some cases, additional stems (e.g., separate stems for each voiced character) may be utilized.

Following creation of original sound mix 101, an M&E sound mix may be derived for foreign sound mix production by implementing a M&E sound mix derivation process 120 that leverages a machine learning model to automate the process of creating an M&E mix 102 given an original sound mix 101. As further described below, the machine learning model may be configured for use by accessing one or more databases 210 or other data stores containing a record of previously created original sound mixes and their associated M&E sound mixes, extracting and categorizing features from the prior sound mixes and M&E sound mixes (step 200), and creating, training, and testing a model that derives M&E mixes with an acceptable accuracy (step 300). Once the machine learning model is configured, it may be applied to an original sound mix 101 to derive an M&E mix 102 (step 500).

Following derivation of the M&E mix 102 using the learned model, at optional process 130, the derived M&E mix 102 may be used during a process of creating and distribution foreign sound mixes. As depicted by FIG. 1, the derived M&E mix 102 and foreign language dialogue tracks 103 may be combined during an automated foreign sound mix derivation process 600, further described below. Particularly, a foreign language dialogue track 103 and M&E mix 102 may be automatically combined during process 600 to create a foreign language soundtrack/audio mix. For example, in the case of an original sound mix 101 that is in an English language and foreign dialogue tracks 103 corresponding to regions (e.g., countries) where English is not the native language, foreign dialogue tracks 103 may comprise a dialogue stem in the native language of the region.

Following creation, the foreign language audio mixes may be assembled and synchronized with video for distribution. In some implementations, the foreign language sound mixes may be distributed as part of a digital media package 150 over a communication medium 180. Communication medium 180 may use one or more suitable communication methods for delivering the digital media package 150, including, for example, satellite communications, cellular communications, fiberoptic cable communications, coaxial cable communications, free space optical communications, or some combination thereof.

For example, a digital media package 150 may be streamed or downloaded over a content delivery network including file servers for storing instances of digital media package 150 and web servers for delivering the stored instances of package 150. As another example, digital media package 150 may be distributed as digital cinema files to a theater over a communication network. After ingesting the digital media 150, a theater may then present it in an auditorium. In digital media distribution implementations where a derived foreign sound mix is in accordance with Society of Motion Picture and Television Engineers (SMPTE) Digital Cinema Packaging (DCP) standards (e.g., SMPTE ST 429-2 DCP), for instance, the foreign sound mix may comprise digital audio track files that are assembled into a DCP including the audio track files (including foreign dialogue), image track files, and a composition playlist including a time code index specifying the order and playback times of the track files.

In some implementations, the foreign language audio mixes may be distributed as part of a physical media package 160. For example, one or more foreign language audio mixes may be stored on an optical disc (e.g., BLU-RAY disc), a flash drive, or other physical media drive that may store media content including the foreign language audio mixes and the original sound mix 101.

Figure 2:
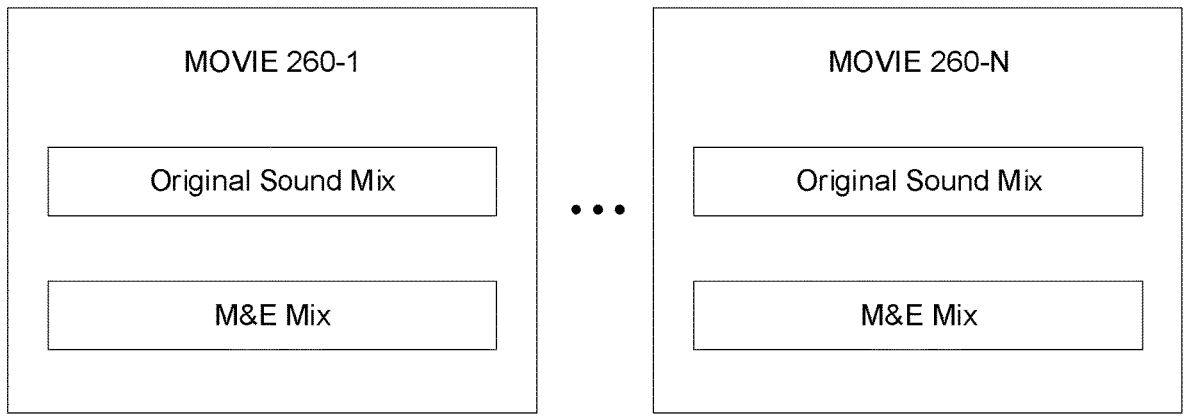
FIG. 2 illustrates an example record of original sound mixes and associated M&E mixes for movies that may be stored in one or more data stores.

As noted above, in various implementations, one or more databases 210 containing a prior record of sound mixes and associated M&E mixes for different media content items (e.g., various original sound mix and M&E mix pairs for different movies and/or television shows) may be leveraged to build a model for automatically deriving an M&E mix 102 given an original or input sound mix 101 containing dialogue in a domestic language. For example, a producer or distributor may leverage decades of original soundtracks and associated M&E mixes that have been produced for films and/or television series. FIG. 2 illustrates an example record of original sound mixes and associated M&E mixes for movies 260-1 to 260-N (individually referred to as a movie 260) that may be stored in one or more databases 210. For a given movie 260, an original sound mix may have been created in a domestic or release language (e.g., English, Spanish, French, Mandarin, or some other language) in an original format (e.g., a DOLBY ATMOS theater format). During the process of preparing to release foreign dubs of the movies in other locations where different language(s) are spoken, M&E mixes may have been derived (e.g., using the conventional technique for creating M&E mixes described above).

Figure 3:
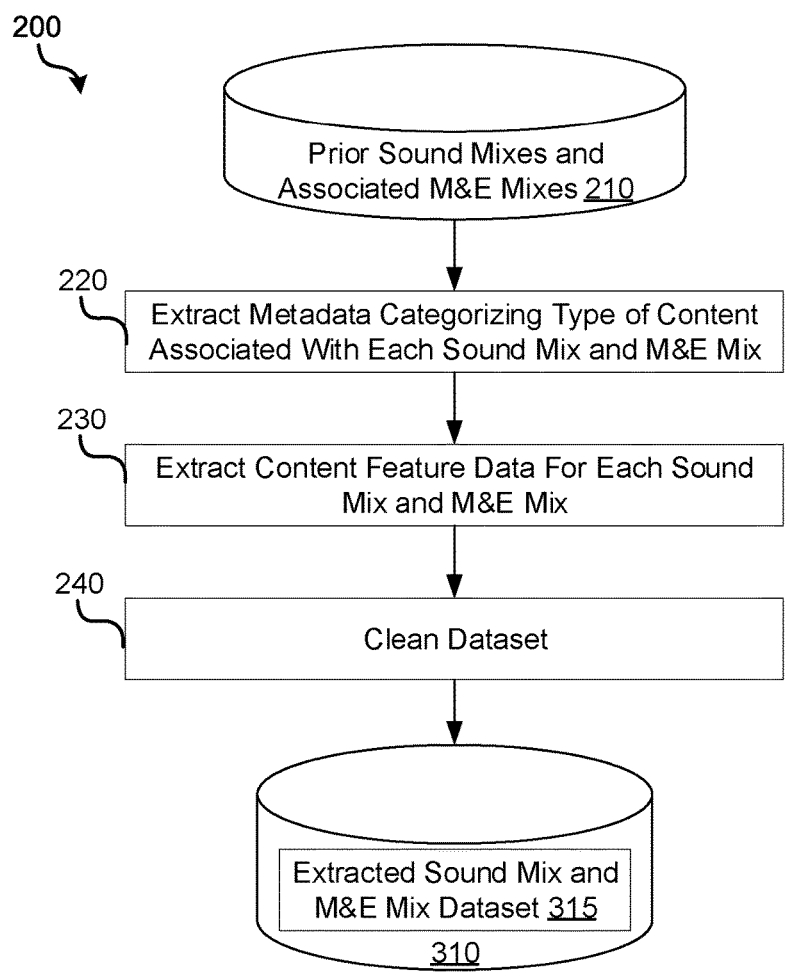
FIG. 3 is an operational flow diagram illustrating an example method for leveraging databases for original sound mix and M&E mix categorization and feature extraction, in accordance with implementations of the disclosure.

FIG. 3 is an operational flow diagram illustrating an example method 200 for leveraging databases 210 for original sound mix and M&E mix categorization and feature extraction, in accordance with implementations of the disclosure. At operation 220, metadata categorizing the type of content associated with each sound mix and/or M&E mix may be extracted. For example, metadata may be extracted that identifies a production studio, a genre, a filmmaker, a type of media content (e.g., feature film, animation film, short, teaser, television episode, VR content, etc.), a domestic language, a re-recording mixer, whether the content is a reel or joined, the first frame of action (FFOA) and last frame of action (LFOA), and/or other feature of the content associated with the sound mix. As further described below, relevant metadata categorizing each sound mix may be used to classify each sound mix such that it is compared with other sound mixes having similar content feature data.

In implementations, metadata may be extracted via the use of an accompanying sidecar descriptive metadata file, from data contained within the header of the digital audio files of the sound mix, and/or from an embedded digital token/watermark.

At operation 230, audio content feature data identifying the content of each sound mix and/or M&E mix, including an identification of human dialogue and the instances or times the human dialogue is present, may be extracted for each original sound mix. As further described below, relevant content feature data of each original sound mix may be compared against corresponding content feature data of their associated M&E mixes to create a model that calculates content feature data of an M&E mix given known content feature data of an original sound mix. In particular, each original soundtrack, including dialogue may be compared at specific time points with its existing M&E to identify what content was added or removed. For instance, one or more of the following may be identified: the removal of dialogue from the original soundtrack, an identification of the types of sounds that were removed besides dialogue in the original soundtrack (e.g., unique create sounds, background crowd conversation with discernible language, production sound effects), etc. As another example, newly added sounds to the M&E mix such as the addition of clothing rustles may be identified. As such, given the content feature data of an original sound mix that includes domestic (e.g., English) dialogue, content feature data for an M&E mix may be calculated and used to generate the M&E mix with the domestic dialogue removed.

In particular implementations, one or more of the following categories of audio content feature data may be extracted for each original sound mix and/or M&E mix: human dialogue-related data, music-related data, and other sound data besides human dialogue-related data and music content-related data. Human dialogue-related data may include, for example: human dialogue content and its associated location, a language of the detected dialogue content, a dialogue dynamic range, a dialogue spectral signature (e.g., providing unique sonic signature to identify specific speaker), dialogue channel weighting (e.g., spatial balance), estimated direct to reverberation ratio of dialogue, non-domestic dialogue content, a dialogue percentage in song cue detection, etc. It should be appreciated that the following types of human dialogue-related data that may be extracted are illustrative, and that other types of human dialogue-related data may be extracted. Example techniques that may be utilized to extract human dialogue-related data include the use of language models (e.g., single and/or parallel), the use of deep neural dialogue context networks, the use of spectral and reverberation data analyzed via signal processing toolsets, etc.

Music-related data may include, for example: a presence of a song with human language, a presence of music that matches an established reference library, vocal song music cues, a stem file including music data, etc. It should be appreciated that the following types of music-related data that may be extracted are illustrative, and that other types of music-related data may be extracted. Example techniques that may be utilized to extract music-related data include the use of support vector machines, spectrogram and/or waveform-based convolutional neural network models, audio source separation, etc.

Other sound data besides human dialogue-related data and music content-related data may include, for example: non-dialogue sounds present in a dialogue stem, sound effects that reference an established sound effects library, background/ambience sounds that may be simultaneously present with dialogue, room tones, foley, etc. It should be appreciated that the following types of sound data besides human dialogue-related data and music content-related data that may be extracted are illustrative, and that other types may be extracted. Example techniques that may be utilized to extract this sound data besides human dialogue-related data and music content-related include the use of Support Vector Machines (SVMs) to identify content, audio event detection, perceptual audio fingerprinting, etc.

At operation 240, the extracted sound mix and/or M&E mix metadata and/or content feature data may be cleaned or normalized. For example, in some implementations, categories of metadata or content feature data may be merged into a single feature. As another example, categories of metadata or content feature data that are less likely to contribute to the final content of an M&E mix may be removed or weighted with less priority from the dataset to focus the subsequent machine learning process on training data including key features that are likely to contribute to the final content of an M&E mix. Categories of content feature data that are more likely to contribute to the final content of an M&E mix may be weighed with high priority. For example, scrubbed dialogue-only content feature data, scrubbed, ambience only feature content data, and/or music cues within vocals may be emphasized over some other feature data. In some implementations, categories of metadata or content feature data may be split into multiple features. It should be noted that cleaning operation 240 may be performed concurrently with operations 220-230 or after operations 220-230.

Following extraction of metadata and content feature data for each sound mix, the extracted metadata and content feature data may be stored/cataloged in a database/library or other data store 310 as an extracted sound mix and M&E mix dataset 315 that may be used to train and test one or more machine learning models used to derive M&E mixes from original sound mixes including domestic dialogue. It should be noted that process 200 may be iterated over time to refine the dataset used to train and test the aforementioned machine learning models. For example, over time it may be discovered that certain categories of metadata (e.g., animated film versus live action film) are more likely to be indicative of the content feature qualities of an original sound mix and its derived M&E mix. Further, as new sound mixes and M&E mixes are created and/or distributed, the extracted sound mix and M&E mix dataset 315 may be expanded. As such, it should be appreciated that the features, categorization, and size of the extracted sound mix and M&E mix dataset 315 may change over time.

Figure 4:
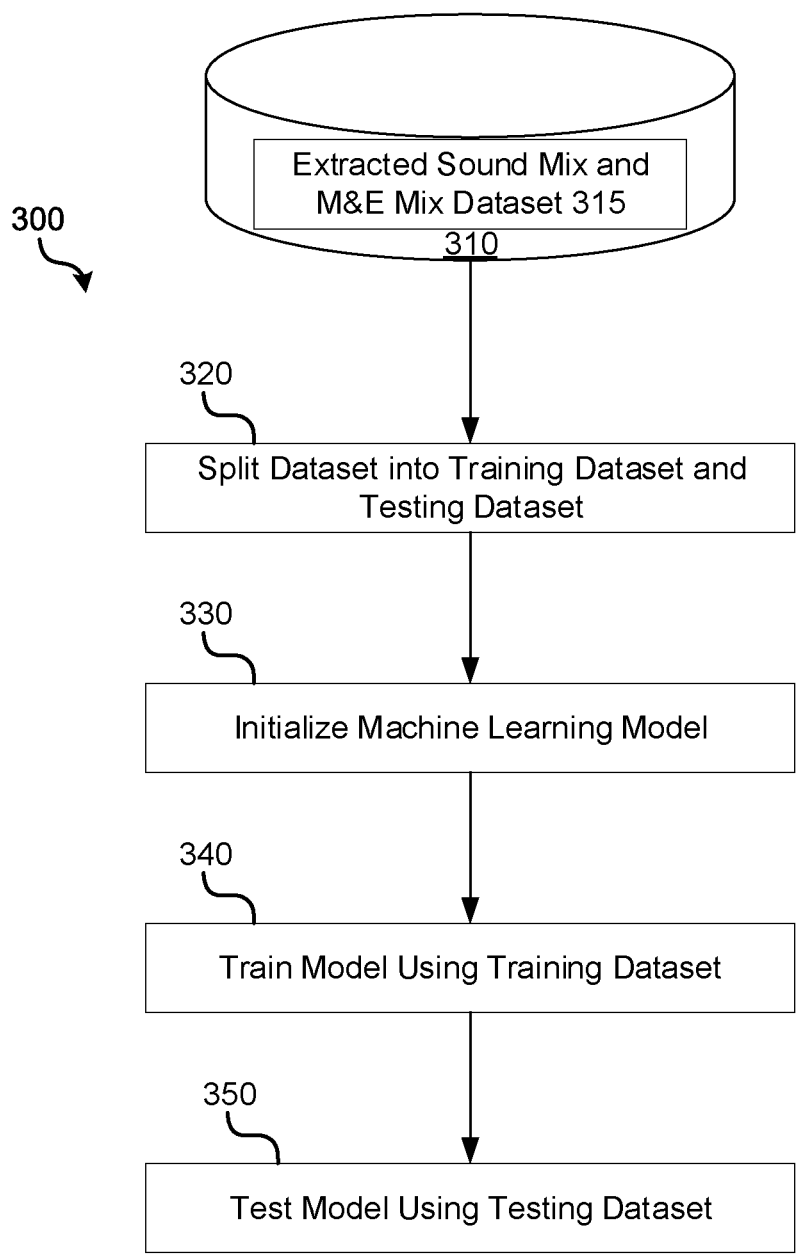
FIG. 4 is an operational flow diagram illustrating an example method for creating, training, and testing one or more models used to derive M&E mixes, in accordance with implementations of the disclosure.

FIG. 4 is an operational flow diagram illustrating an example method 300 for creating, training, and testing one or more models used to derive M&E mixes, in accordance with implementations of the disclosure. At operation 320, an extracted sound mix and M&E mix dataset 315 stored in a database 310 may be split into a training dataset and testing dataset. In implementations, each of the training dataset and testing dataset may comprise a subset of known sound mix inputs (e.g., extracted content feature data/metadata of original sound mix with domestic language dialogue track) and associated outputs (e.g., content feature data of M&E mix associated with sound mix). In implementations, the training dataset may comprise a majority of the dataset (e.g., 60%, 70%, 80%, etc.). In implementations, the datasets may be randomized, prior to splitting, to ensure an equal distribution of patterns of data. Using FIG. 4 as an example, 75% of sound mix groups may be randomly selected to be part of the training dataset, with the remaining 25% being randomly selected to be part of the testing dataset.

At operation 330, a machine learning model may be initialized to perform training using the training dataset. The model may be selected to find patterns/trends between content feature data of an original sound mix and an M&E sound mix given a categorization (e.g., metadata) of the sound mixes, and to find other patterns/trends in the content feature data of sound mixes that may be used to derive an M&E mix.

In implementations, the model may be initialized by selecting one or more supervised learning algorithms that learn patterns using known inputs and known outputs. For example, in some implementations a known input may include an original sound mix metadata and content features, and a known output may include the metadata and content features of an M&E mix of the original sound mix. As such, relationships between content feature data of an original sound mix and content feature data of an M&E mix be determined. In some implementations, a known input may include a first content feature data of a sound mix, and a known output may include a second content feature data of the associated M&E mix.

Supervised learning algorithms such as linear regression, logistic regression, decision trees, k-nearest neighbors, neural networks, and/or support vector machines may be utilized. During initialization, hyperparameters of the algorithms may be set. In some implementations, an ensemble model that combines multiple statistical modeling techniques may be utilized. For example, bagging (averaging of multiple models), a bucket of models (using training data to create different models, and then picking the best one), boosting, stacking, or other ensemble model techniques may be utilized.

In some implementations, unsupervised learning algorithms may be utilized to initialize the model. For example, k-means clustering, principal and independent component analysis, association rules, or other suitable unsupervised learning algorithms may be used. In some implementations, semi-supervised learning algorithms or a combination or supervised and unsupervised learning algorithms may be used.

At operation 340, the model may be trained using the training dataset. For example, using one or more of the aforementioned supervised learning algorithms, a machine may analyze and determine relationships between sound mix metadata and content feature data in the training data to develop a model that may calculate M&E mix content feature data given an input sound mix.

In some implementations, training may be used to identify trends from technical version requests, trends by studio, trends by filmmaker, trends by genre, trends by intended audience, trends for specific recording mixers, and/or other trends.

At operation 350, the model developed during training may be tested using the testing dataset. For example, given an original sound mix of the testing dataset having a particular set of content feature data, that content feature data may be provided to the trained model to calculate content feature data of an M&E mix. The content feature data of the M&E sound mix that is calculated by the model may thereafter be compared with the actual, known content feature data of the M&E sound mix in the testing dataset to determine a difference (e.g., mean absolute error) between the calculated/predicted M&E content feature data and actual M&E content feature data.

In implementations, the performance of the model may be calculated from testing as an average error score for all predictions. If the average error score is too high, additional iterations of method 300 (and optionally, method 200) may be performed. For example, hyperparameters of the algorithms used in the model may be adjusted, the algorithms of the model may be changed, and/or different features of data may be considered in the model.

Alternatively, if the mean absolute error is satisfactory (e.g., the content feature data of M&E sound mixes calculated by the model is sufficiently close to the actual content feature of the existing M&E sound mixes), the model may be made available to create/derive M&E mixes using original sound mixes (e.g., method 500).

In some implementations of method 300, different models may be trained, tested, and/or developed depending on the categorizations of the sound mixes. For example, separate models may be created to derive M&E mixes for animated films and live action films. As another example, separate models may be created to derive M&E mixes for television series and movies. As further examples, separate models may be created to derive M&E mixes for each studio or to derive M&E mixes for each genre of content.

In some implementations of method 300, a cross validation process may be performed whereby training and testing data is split into various combinations and trained and tested in these various combinations. For example, an exhaustive cross validation or k-fold validation process may be performed.

Figure 5:
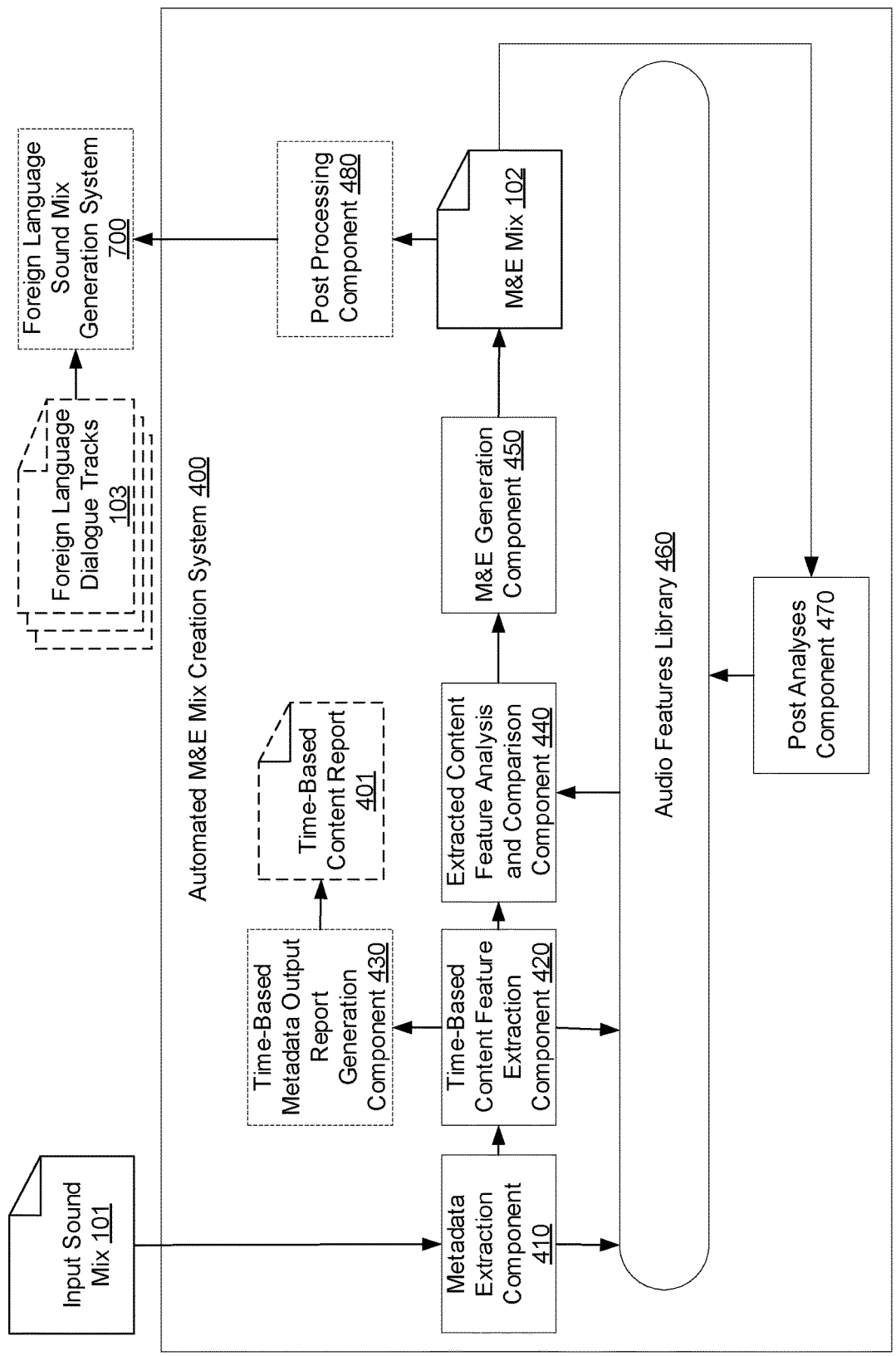
FIG. 5 illustrates an example architecture of components of an automated M&E mix creation system, in accordance with implementations of the disclosure.

FIG. 5 illustrates an example architecture of components of an automated M&E mix creation system 400, in accordance with implementations of the disclosure. System 400 is configured to take as an input an input sound mix 101 having domestic dialogue and output an M&E mix 102. For example, system 400 may receive an original stems sound mix of a film having a dialogue stem, a music stem, and a sound effects stem, and output an M&E mix having a music stem and a sound effects stem. In some optional implementations, further described below, system 400 may also be configured to create a time-based content report 401 during the process of creating the M&E mix 102 and/or create foreign sound mixes using the created M&E mix.

One or more components of system 400 may be implemented as a software package including executable machine-readable instructions. In some implementations, system 400 may be implemented as a cloud-based system that performs M&E sound mix derivation in accordance with the disclosure. In such implementations, system 400 may be distributed across multiple servers to allow for parallel processes for M&E mix derivation. Data related to M&E sound mix derivation may be stored and accessed on virtual servers hosted by a third-party service provider. In some implementations, one or more components of system 400 may correspond to a producer or distributor of media content.

System 400 may include a metadata extraction component 410, a time-based content feature extraction component 420, an extracted content feature analysis and comparison component 440, an M&E generation component 450, an audio features library 460, and a post analyses component 470. In some optional implementations, system 400 may also include a time-based metadata output report generation component 430, a post-processing component 480, and/or a foreign language sound mix generation system 700.

Metadata extraction component 410 may be a component for extracting metadata categorizing the type of content associated with input sound mix 101. For example, metadata may be extracted that categorizes whether input sound mix 101 is associated with a particular production studio, genre, filmmaker, a type of media content, a domestic language of input sound mix 101, a re-recording mixer, whether the content is a reel or joined, the FFOA, the LFOA, etc. This extraction of metadata may utilized during a process for creating an M&E mix in multiple respects. First, a domestic dialogue detector may be calibrated with an input metadata identifying a domestic language metadata. Additionally, the genre, production studio, filmmaker and/or re-recording mixer metadata may contribute to a learned model determining the common mix balance of the stems in comparison to one another. Further, metadata describing reel-based, continuous, feature or broadcast may determine analysis windowing and exclusion of technical content such as calibration pops or tones.

In some implementations, metadata extraction component 410 may also be comprised of components for performing basic quality control for digital audio errors (corrupted bits/headers, technical saturation errors, etc.)

Time-based content feature extraction component 420 may be a component for identifying and extracting time-based content feature data of the input sound mix, including an identification of the presence of domestic language dialogue and where it is present (e.g., time points or frame number) within the sound mix. These content features may be extracted in a manner similar to that described above with reference to operation 230. For example, utilizing audio signal processing, the input sound mix 101 may be analyzed to identify human dialogue content and its location. Additionally, other human dialogue-related data, music-related data, and other sound data may be extracted. For example, one or more of the following characteristics may be extracted: a domestic language percentage detection, a dialogue dynamic range, a dialogue spectral content/balance, a dialogue channel weighting, clothing detection, room tone detection, non-dialogue discrete sounds detection, vocal song music cue detection and categorization, dialogue percentage in song cue detection (e.g., for licensing versions) and comparative balance of music and sound effect categorized stems in original full domestic soundtrack.

The extracted metadata and content feature data may be measured and cataloged into an audio features library 460 that includes training data for a model used to automatically generate M&E mixes from original sound mixes. For example, audio features library 460 may correspond to a database 310 as described above.

In some optional implementations, system 400 may include a time-based metadata output generation component 430 that uses the output of component 420 to generate a time-based content report 401 of content features contained within the original sound mix 101, including, for example, located human dialogue, non-dialogue human sounds, included foley, and/or potentially licensable music. The report 401 may be generated in a suitable format such as a spreadsheet, a text file, a document file, or other format that is human interpretable.

In particular implementations, the generated time-based content report 401 may include one or more of the following: a time domain reporting of dialogue content (e.g., in/out point or timecode for specific dialogue lines), character-based dialogue locations within the sound mix, an acoustic/ambient location of a scene where dialogue is present, an identification and location of non-dialogue human sounds (e.g., e.g., breaths, grunts, sighs), an identification and location of non-human sounds already combined in the dialogue stem (e.g., footsteps, chair squeaks, pencil tapping), a timeline reporting of vocal songs (e.g., that may be used for territorial licensing purposes), a dialogue transcription with a timeline (e.g., for foreign dubbing preparation/censor passing), etc.

Extracted content feature analysis and comparison component 440 may be a component for applying one or more machine learned models (e.g., where the models were learned as described above with reference to methods 200-300) to the extracted metadata and content feature data of input sound mix 101 to calculate target content features of an M&E mix. The model may compare the extracted metadata and content feature data with previous metadata and content feature data analyzed and cataloged in audio features library 460. For example, given an input sound mix 101 having English-language dialogue, a model may use comparisons to previously extracted content in the library 460 to determine an appropriate mapping of content feature data from the input sound mix 101 to an M&E mix such that an M&E mix without English language dialogue is created.

In some implementations, component 440 may use the extracted metadata to select the type of machine learned model that is applied to the extracted content feature data of input sound mix 101. For example, different models may be applied depending on the domestic dialogue language of input sound mix 101, the production studio of input sound mix 101, the content type of sound mix 101 (e.g., animation vs. live action), or based on some other metadata associated with sound mix 101. In some implementations, component 440 may select the type of model that is applied to the extracted content feature data of input sound mix 101 depending on the audio format of the input sound mix 101. For example, a different model may applied depending on whether the input sound mix 101 includes stereo sound or surround sound. In some implementations, selection of a model from a set of different models may be based on a determination of the model having the lowest error score for one or more of the metadata for the sound mix 101. For example, a particular model may be selected because it has the lowest average error score for mixes having animation and a particular dialogue language.

In some implementations, extracted audio content features of the input sound mix 101 are compared against the target content features of the M&E mix to determine control variables for generating an M&E mix.

M&E generation component 450 may generate the M&E mix 102 given the calculated content features of the M&E mix and the content features of the input sound mix 101. For example, the aforementioned control variables generated by component 440 from comparison of the extracted features with the target features may be used to perform digital signal processing to generate a desired M&E mix 102. For example, M&E generation component 450 may perform adjustment of the content features of the input sound mix 101 to generate the M&E mix 102. One or more of dialogue extraction, non-dialogue human sound extraction, non-human sound extraction from the dialogue track, and music cue/song extraction may be performed on the sound mix 101. Additionally, in some implementations room tone/ambience may be generated to fill the gaps left by dialogue extraction. For example, a sample tone from a similar scene may be used as a foundation for synthesis. The generated tone may be leveled to provide a volume and spectral match. Using a small sample of ambient tone existing in isolation before dialogue occurrence, additional tone may be synthesized via convolution techniques with random noise generation.

Post analyses component 470 may be a component for ingesting the audio content features extracted from sound mix 101 and the audio content features created for the newly-generated M&E mix 102 into audio features library 460 to further train/refine the machine learning model. In some implementations, post-analysis component 470 may provide an interface for a user to validate the newly-generated M&E mix and to provide additional feedback to tune the model.

Optional processing component 480 may be a component for processing the newly-generated M&E mix to comply with technical version digital file specifications. For example, the newly-generated M&E mix 102 may be processed to adjust loudness levels, ad just a delay and phase compared to a source, and perform other post-processing operations.

Optional foreign language sound mixes generation system 700 may be configured to automatically generate foreign language sound mixes using M&E mix 102 and one or more foreign language foreign language dialogue tracks 103. In particular, system 700 may provide for automatic insertion of a foreign language dialogue track 103 into an M&E mix 102 to derive a foreign/regional soundtrack in the associated foreign/regional language. Although in this example system 700 is depicted as being external to system 400, in other implementations it may be implemented as part of system 400.

Figure 6:
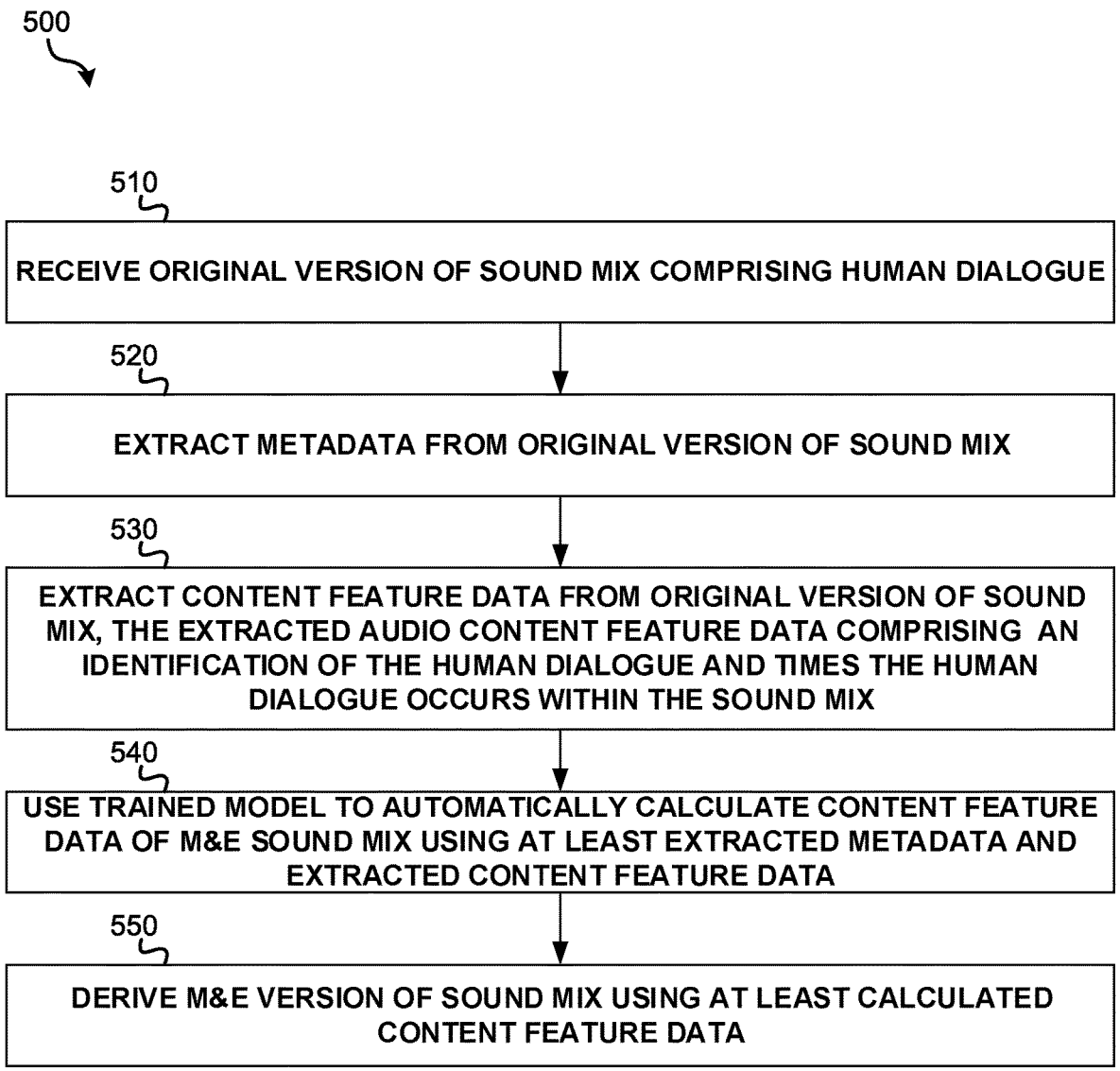
FIG. 6 is an operational flow diagram illustrating an example method of creating an M&E sound mix from an original version of a sound mix including domestic dialogue, in accordance with implementations of the disclosure.

FIG. 6 is an operational flow diagram illustrating an example method 500 of creating an M&E sound mix from an original version of a sound mix including domestic dialogue, in accordance with implementations of the disclosure. In implementations, method 500 may be performed by sound mix versioning system 400 (e.g., by executing machine readable instructions stored in a memory).

At operation 510, an original version of a sound mix is received. For example, an original version of a sound mix created for a film or show may be ingested by a sound mix versioning system 400. At operation 520, metadata is extracted from the original version of the sound mix to categorize the type of content associated with the original sound mix. For example, a metadata extraction component 410 may be used to extract metadata categorizing the sound mix by domestic language, production studio, genre, a filmmaker, type of media content, and/or re-recording mixer. Additionally, the extracted metadata may identify a FFOA and/or LFOA of the sound mix.

At operation 530, content feature data is extracted from the original version of the sound mix, the extracted content feature data including an identification of human dialogue and times the human dialogue occurs within the sound mix. Additionally, the extracted content feature data may include human dialogue-related data other than the identification of the human dialogue and times the human dialogue occurs within the sound mix, music-related data, and other sound data besides human dialogue-related data and music content-related data. In particular implementations, the content feature data extracted from the sound mix includes an identification of non-dialogue sounds present in a dialogue stem, and times the non-dialogue sounds occur within the dialogue stem.

At operation 540, a trained model is used to automatically calculate content feature data of an M&E sound mix using at least the extracted metadata and the extracted content feature data of the sound mix. The trained model may be used to map human dialogue-related data, music-related data, and/or other sound data of the sound mix comprising human dialogue to music-related data and/or other sound data of the M&E sound mix.

At operation 550, the M&E sound mix is derived using at least the calculated content feature data. For example, the calculated content feature data may be used to: remove human dialogue identified in the sound mix, insert music or other non-dialogue sound data into locations/times of the sound mix where human dialogue was removed, and/or insert music or other non-dialogue sound data into locations/times of the sound mix other than where human dialog was removed.

Figure 7:
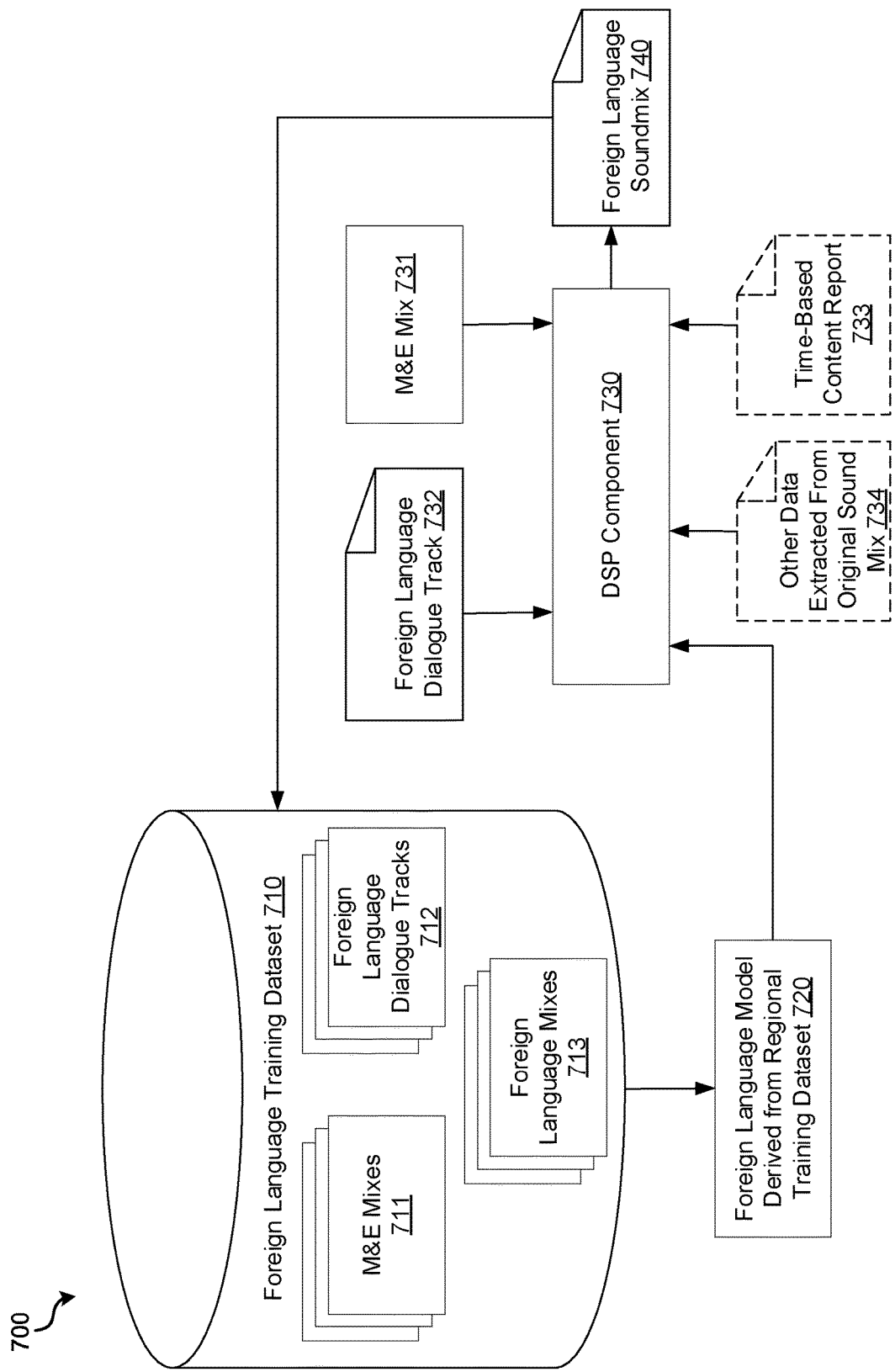
FIG. 7 illustrates an example architecture of components of an automated foreign language sound mix generation system, in accordance with implementations of the disclosure.

FIG. 7 illustrates an example architecture of components of an automated foreign language sound mix generation system 700, in accordance with implementations of the disclosure.

One or more components of system 700 may be implemented as a software package including executable machine-readable instructions. In some implementations, system 700 may be implemented as a cloud-based system that performs foreign language sound mix derivation in accordance with the disclosure. In such implementations, system 700 may be distributed across multiple servers to allow for parallel processes for foreign language sound mix derivation. Data related to foreign language sound mix derivation may be stored and accessed on virtual servers hosted by a third-party service provider. In some implementations, one or more components of system 700 may correspond to a producer or distributor of media content.

System 700 may include a regional training dataset 710, a foreign language model derived from a regional dataset 720, and a digital signal processing (DSP) component 730. As depicted, a foreign/regional language soundmix 740 may be derived using an input M&E mix 731, an input foreign/regional language dialogue track 732, and a model 720 trained using a dataset 710 including training data for the specific foreign/regional language. It should be appreciated that although a single model is illustrated in this example, a model may be derived for each foreign/regional language using a dataset corresponding to the foreign/regional language.

As depicted, foreign language training dataset 710 may include a record of prior M&E mixes 711, their associated foreign language dialogue tracks 712, and their associated foreign language mixes 713. In some implementations, foreign language training dataset 710 may also include the original sound mixes associated with M&E mixes 711. Owing to the nature of specific regional/cultural language preferences for sonic characteristics of sound in mixes (e.g., a regional/market preference for having dialogue that is much louder than music and/or effects), a model 720 may be tuned to these regional preferences by using a training dataset 710 corresponding to prior mixes and tracks associated with that language. As such, a final language sound mix 740 may be derived having sonic characteristics that are appropriate for the region.

Using training dataset 710, a regional or foreign language model 720 including control parameters for foreign language sound mixing may be developed by extracting content feature data from the mixes or tracks, including: a dialogue to M&E balance (e.g., equalization), a dialogue spatial distribution, and/or an overall spectral shape. Following derivation of model 720, DSP component 730 may use control parameters from model 720 to perform signal processing on an input M&E mix 731 and foreign language dialogue track 732, including insertion of track 732 into the M&E mix 731 and sonic adjustment toward regional aesthetic targets to derive foreign language sound mix 740. For example, one or more of a dialogue to M&E balance (e.g., equalization), a dialogue spatial distribution, and/or an overall spectral shape may be adjusted. The resulting foreign sound mix 740 may be reintroduced into the training dataset 710 for further development.

In some implementations, creation of the foreign language sound mix 740 may be facilitated using metadata from a time-based content report 733 and/or other data extracted from an original sound mix 734 that is derived as discussed above with reference to FIG. 5 (e.g., derived using components 420 and/or 430). The metadata and/or other data may act as control parameters for spectral, spatial and level balance signal processing of the foreign language dialogue track 732 and/or M&E mix 731 that are mixed together. For example, one or more of the following metadata from a report 733 may be utilized: the domestic dialog timeline location metadata to inform synchronization of foreign dialog lines, domestic dialog spectral and reverberant characteristic metadata to inform dialog creative signal processing, and generation of ambient tone to fill vacancies left by domestic/foreign language consonant disparities. In other implementations, the aforementioned metadata and/or data may be derived independently of M&E mix creation (e.g., independent of the process discussed above with reference to FIG. 5). As such, it should be appreciated that the techniques described herein for M&E mix creation and foreign language mix creation may be implemented independent of one another or in combination.

Figure 8:
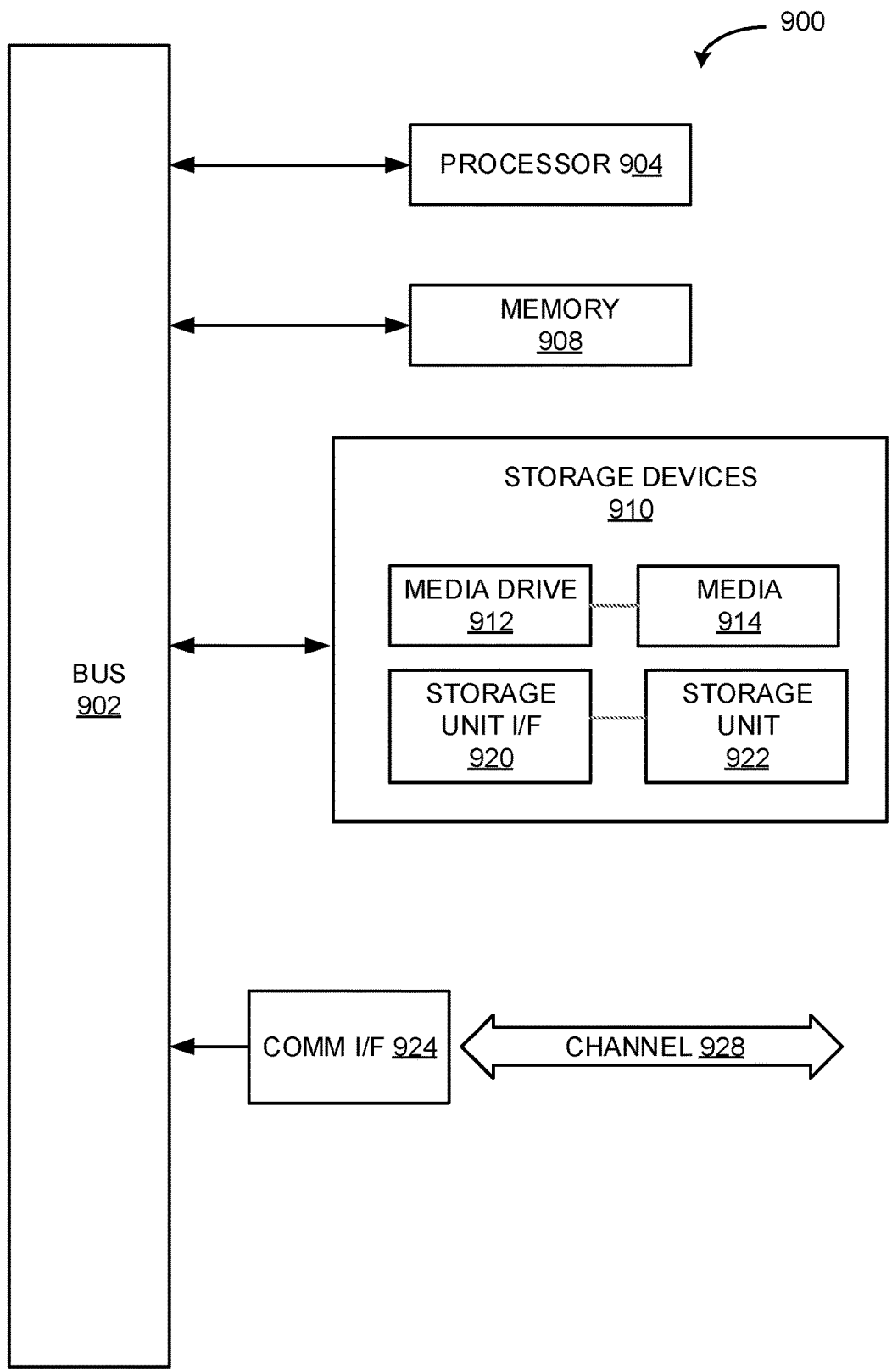
FIG. 8 illustrates an example computing component that may be used to implement various features of the methods disclosed herein.

FIG. 8 illustrates an example computing component that may be used to implement various features of the methods disclosed herein.

As used herein, the term component might describe a given unit of functionality that can be performed in accordance with one or more implementations of the present application. As used herein, a component might be implemented utilizing any form of hardware, software, or a combination thereof. For example, one or more processing devices such as a CPU, GPU, APU, DSP, FPGA, ASIC, SOC, and/or other processing circuitry, logical components, software routines and/or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

FIG. 8 illustrates an example computing component 900 that may be used to implement various features of the methods disclosed herein. Computing component 900 may represent, for example, computing or processing capabilities found within a server or other machine(s) operating over the cloud, desktops and laptops; hand-held computing devices (tablets, smartphones, etc.); mainframes, supercomputers, workstations or servers; or any other type of special-purpose or general-purpose computing devices as may be desirable or appropriate for a given application or environment. Computing component 900 may also represent computing capabilities embedded within or otherwise available to a given device.

Computing component 900 might include, for example, a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, an optical disk drive, a CD, DVD, or BLU-RAY drive (R or RW), or other removable or fixed media drive might be provided. Accordingly, storage media 914 might include, for example, a hard disk, a solid state drive, cartridge, optical disk, a CD, a DVD, a BLU-RAY, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 908, storage unit 922, and media 914. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein. For example, execution of such instructions many enable computing component 900 to perform methods 200, 300, and/or 500.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply at the functionality described or claimed as part of the component are all configured in a common package. Indeed, any or all of the various parts of a component, whether control logic or other parts, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
receiving a sound mix comprising human dialogue;
extracting metadata from the sound mix, wherein the extracted metadata categorizes the sound mix;
extracting content feature data from the sound mix, the extracted content feature data comprising an identification of the human dialogue and instances the human dialogue occurs within the sound mix;
automatically calculating, with a trained model, using at least the extracted metadata and the extracted content feature data of the sound mix, content feature data of a music and effects (M&E) sound mix; and
deriving, using at least the calculated content feature data, the M&E sound mix.

2. The method of claim 1, wherein the content feature data extracted from the sound mix further comprises one or more of: human dialogue-related data other than the identification of the human dialogue and instances the human dialogue occurs within the sound mix, music-related data, or other sound data besides human dialogue-related data and music content-related data.

3. The method of claim 2, wherein the extracted metadata identifies one or more of the following categories of the sound mix: a domestic language, a production studio, a genre, a filmmaker, a type of media content, a re-recording mixer, a first frame of action (FFOA), or a last frame of action (LFOA).

4. The method of claim 1, further comprising: generating, using at least the extracted content feature data, a time-based content report file of content features contained within the sound mix, the content features comprising one or more of the following: a location of human dialogue contained within the sound mix, a location of non-dialogue human sounds contained within the sound mix, or a location of music contained within the sound mix.

5. The method of claim 4, wherein the content features of the time-based content report file comprise an identification of licensable music contained within the sound mix.

6. The method of claim 1, further comprising: mixing the derived M&E sound mix with a foreign language dialogue track to derive a foreign language sound mix comprising human dialogue of the foreign language dialogue track.

7. The method of claim 6, wherein mixing the derived M&E sound mix with the foreign language dialogue track to derive the foreign language sound mix, comprises: using a second model trained using a plurality of previously created foreign language sound mixes and associated M&E sound mixes and foreign language dialogue tracks.

8. The method of claim 7, wherein using the second trained model, comprises: using the second trained model to adjust one or more of the following parameters of the derived foreign language sound mix: a dialogue to M&E balance, a dialogue spatial distribution, or a spectral shape.

9. The method of claim 2, wherein:
the content feature data extracted from the sound mix comprises the human dialogue-related data other than the identification of the human dialogue and instances the human dialogue occurs within the sound mix, the music-related data, and the other sound data; and
automatically calculating the content feature data of the M&E sound mix comprises: mapping, using the trained model, the human dialogue-related data other than the identification of the human dialogue and instances the human dialogue occurs within the sound mix, the music-related data, and the other sound data to music-related data and other sound data of the M&E sound mix.

10. The method of claim 9, wherein deriving the M&E sound mix comprises: removing, using at least the calculated content feature data of the M&E sound mix, the identified human dialogue from the sound mix.

11. The method of claim 10, wherein deriving the M&E sound mix comprises: inserting, using at least the calculated content feature data of the M&E sound mix, music or other non-dialogue sound data into locations of the sound mix where the identified human dialogue is removed.

12. The method of claim 11, wherein the content feature data extracted from the sound mix further comprises an identification of non-dialogue sounds present in a dialogue stem, and instances the non-dialogue sounds occur within the dialogue stem.

13. The method of claim 2, further comprising: creating the trained model by performing operations comprising:
creating, using a plurality of previously created sound mixes and associated M&E mixes, a first dataset comprising extracted metadata and extracted content feature data for each of the plurality of previously created sound mixes and associated M&E mixes;
dividing the first dataset into a training dataset and a testing dataset, wherein each of the training dataset and testing dataset comprise a plurality of sound mixes and associated M&E mixes;
training the model using at least the training dataset and a supervised learning algorithm that correlates a content feature of an original sound mix with a content feature of an M&E mix; and
testing the model using the testing dataset.

14. The method of claim 1, wherein automatically calculating, with the trained model, the content feature data of the M&E sound mix, comprises: selecting, based on at least a category of the sound mix identified from the extracted metadata, the trained model from a plurality of trained models.

15. The method of claim 1, further comprising: distributing the derived M&E sound mix.

16. A non-transitory computer-readable medium having executable instructions stored thereon that, when executed by a processor, performs operations comprising:
receiving a sound mix comprising human dialogue;
extracting metadata from the sound mix, wherein the extracted metadata categorizes the sound mix;
extracting content feature data from the sound mix, the extracted content feature data comprising an identification of the human dialogue and instances the human dialogue occurs within the sound mix;
automatically calculating, with a trained model, using at least the extracted metadata and the extracted content feature data of the sound mix, content feature data of a music and effects (M&E) sound mix; and
deriving, using at least the calculated content feature data, the M&E sound mix.

17. The non-transitory computer-readable medium of claim 16, wherein the content feature data extracted from the sound mix further comprises one or more of: human dialogue-related data other than the identification of the human dialogue and instances the human dialogue occurs within the sound mix, music-related data, or other sound data besides human dialogue-related data and music content-related data.

18. The non-transitory computer-readable medium of claim 17, wherein:

the content feature data extracted from the sound mix comprises the human dialogue-related data other than the identification of the human dialogue and instances the human dialogue occurs within the sound mix, the music-related data, and the other sound data; and automatically calculating the content feature data of the M&E sound mix comprises: mapping, using the trained model, the human dialogue-related data other than the identification of the human dialogue and instances the human dialogue occurs within the sound mix, the music-related data, and the other sound data to music-related data and other sound data of the M&E sound mix.

19. The non-transitory computer-readable medium of claim 18, wherein deriving the M&E sound mix comprises: removing, using at least the calculated content feature data of the M&E sound mix, the identified human dialogue from the sound mix.

20. The non-transitory computer-readable medium of claim 19, wherein deriving the M&E sound mix comprises: inserting, using at least the calculated content feature data of the M&E sound mix, music or other non-dialogue sound data into locations of the sound mix where the identified human dialogue is removed.

* * * * *